(12) United States Patent
Wallin et al.

(10) Patent No.: US 9,618,144 B2
(45) Date of Patent: Apr. 11, 2017

(54) VENTILATION DUCT

(71) Applicant: CLIMATE RECOVERY IND AB, Kalmar (SE)

(72) Inventors: Peter Wallin, Kalmar (SE); Göran Bernhardsson, Stockholm (SE)

(73) Assignee: CLIMATE RECOVERY IND AB, Kalmar (SE)

( * ) Notice: Subject to any disclaimer, the term of this patent is extended or adjusted under 35 U.S.C. 154(b) by 134 days.

(21) Appl. No.: 14/346,081

(22) PCT Filed: Sep. 20, 2012

(86) PCT No.: PCT/SE2012/000142
§ 371 (c)(1),
(2) Date: Mar. 20, 2014

(87) PCT Pub. No.: WO2013/043100
PCT Pub. Date: Mar. 28, 2013

(65) Prior Publication Data
US 2014/0290785 A1  Oct. 2, 2014

(30) Foreign Application Priority Data

Sep. 22, 2011 (SE) ..................................... 1100695

(51) Int. Cl.
*F16L 9/00* (2006.01)
*F16L 9/14* (2006.01)
*F24F 13/02* (2006.01)

(52) U.S. Cl.
CPC .................. *F16L 9/14* (2013.01); *F16L 9/003* (2013.01); *F16L 9/006* (2013.01); *F24F 13/0245* (2013.01); *F24F 13/0272* (2013.01)

(58) Field of Classification Search
CPC .. F16L 9/003; F16L 11/112; F16L 9/14; F16L 9/006; F16L 9/128; F16L 9/08; F16L 9/085; F24F 13/0245; F24F 13/0272
(Continued)

(56) References Cited

U.S. PATENT DOCUMENTS

| 347,416 A | * | 8/1886 | Buckingham | ........... F16L 11/10 |
| | | | | 138/119 |
| 789,315 A | * | 5/1905 | Bergstrom | ................ B65B 7/14 |
| | | | | 138/119 |

(Continued)

FOREIGN PATENT DOCUMENTS

| EP | 2053320 A1 | 4/2009 |
| FR | 1211058 A | 3/1960 |

(Continued)

OTHER PUBLICATIONS

International Preliminary Report on Patentability (Mar. 25, 2014) for corresponding International Apptioation PCT/SE2012/000142.

(Continued)

*Primary Examiner* — Charles P Cheyney
(74) *Attorney, Agent, or Firm* — WRB-IP LLP

(57) ABSTRACT

A duct includes a number of wall sections which are at least partly produced from fiber material and a binder agent. Together, the wall sections define a closed, elongate flow space. The wall sections which meet one another are united by the intermediary of at least one longitudinal fold or joint line. In the fiber material and the binder agent of the duct, there are disposed longitudinal rigidifying elements. On the outside of the duct, there are longitudinal bead-liked projections which include the fiber material and the binder agent.

14 Claims, 6 Drawing Sheets

(58) Field of Classification Search
USPC ....... 138/153, 151, 174, 121, 173, 175, 119, 138/156–158, 172
See application file for complete search history.

(56) References Cited

U.S. PATENT DOCUMENTS

| | | | | |
|---|---|---|---|---|
| 1,930,285 | A * | 10/1933 | Robinson | B64C 3/00 114/79 W |
| 2,371,556 | A * | 3/1945 | Steffens | F16L 9/003 138/119 |
| 2,396,826 | A * | 3/1946 | Callan | F16L 9/003 138/157 |
| 2,722,237 | A * | 11/1955 | Rosel | F04D 13/10 138/103 |
| 3,475,876 | A * | 11/1969 | Oroschakoff | E04C 5/04 52/581 |
| 3,681,925 | A * | 8/1972 | Schmunk | E02B 11/005 138/121 |
| 3,715,454 | A * | 2/1973 | Kleykamp | A47L 9/24 138/121 |
| 3,770,876 | A * | 11/1973 | Post | B29C 63/18 174/138 F |
| 3,793,131 | A | 2/1974 | Hedges | |
| 3,818,948 | A | 6/1974 | Hedges | |
| 4,084,066 | A * | 4/1978 | Gillemot | H02G 15/18 138/156 |
| 4,777,072 | A * | 10/1988 | Cason, Jr. | B29C 61/10 138/128 |
| 5,002,423 | A * | 3/1991 | Mileti | E01F 15/146 256/13.1 |
| 5,028,007 | A * | 7/1991 | Wokal | B05B 1/202 239/518 |
| 5,219,403 | A | 6/1993 | Murphy | |
| 5,335,448 | A * | 8/1994 | Martinez | A01G 17/14 135/118 |
| 5,996,645 | A | 12/1999 | Hosokawa et al. | |
| 6,957,670 | B1 * | 10/2005 | Kajino | F16L 9/003 138/119 |
| 2007/0221279 | A1 * | 9/2007 | Johnson | F16L 3/00 138/106 |

FOREIGN PATENT DOCUMENTS

| | | |
|---|---|---|
| WO | 2009145698 A1 | 12/2009 |
| WO | 2011048105 A1 | 4/2011 |

OTHER PUBLICATIONS

International Search Report (Jan. 17, 2013) for corresponding International Application PCT/SE2012/000142.
European Search Report (Mar. 18, 2015) for corresponding European App. EP 12 83 4425.

* cited by examiner

VENTILATION DUCT

BACKGROUND AND SUMMARY

The present invention relates to a duct which comprises a number of wall sections produced at least partly from fibre material and a binder agent, which together define a closed, elongate flow space, mutually meeting wall sections being united by the intermediary of at least one longitudinal fold or joint line.

As regards ventilation ducts, increasingly higher demands are placed today on large cross sectional areas, with a view to reducing the flow resistance and thereby energy consumption. As large dimensions as 600-700 mm×300-400 mm have been mentioned as relevant. Further, stringent demands are placed on the ability of the ventilation duct to withstand partial vacuum of at least 200 Pa, as well as partial vacuum surges of 750 Pa. Performance wishes of as large partial vacuum as 1200 Pa have also been raised.

WO 2009/145698 discloses a ventilation duct which is manufactured from a fibre material and a binder agent. The illustrated embodiment is of four-sided cross section, square or rectangular, and as a result has four longitudinal wall sections. Each one of these wall sections displays transverse rigidifying elements in the form of impressions where the quantity per volume unit of fibres and binder agent is considerably higher than that which applies to the rest of the wall sections.

The wall sections are interconnected with one another in the corners of the ventilation duct where fold lines are provided so that the ventilation duct may be flattened out to substantially planar state in order subsequently to be rolled up for compact storage and transport. Cutting of the duct into relevant lengths may also be put into effect most simply in the flattened state of the duct.

The fold lines are in the form of the longitudinal, external impressions in the combined fibre and binder agent material, for which reason the quantity of fibres and binder agent per volume unit is, also here, considerably greater than that which applies to surrounding wall sections.

Because of its relatively slight cross sectional area, the ventilation duct according to the WO publication is self-supporting and can, as a result, be secured in fixing means which are mutually spaced apart quite far, often of the order of magnitude of 2-3 m.

Largely, the above described ventilation duct functions well, but cannot meet with the above-described requirements on large cross sectional areas and the ability to withstand large partial vacuum, and moreover displays certain shortcomings.

Differences or unevenness in the fibre material from which the ventilation duct is manufactured entail that the ventilation duct will have regions which are weaker than neighbouring sections. Such weaker regions will have as a consequence that, on rough handling, the ventilation duet will have a tendency to give way or, in the event of partial vacuum, to buckle inwards at the weakened points. If the ventilation duct has once given way, it will then become even weaker.

When the prior art ventilation duct has been flattened out and rolled up, it has a certain inherent memory when it is once again unrolled and raised. This implies that the ventilation duct has a tendency to become warped, so that its cross section deviates from the intended configuration. The deformed or irregular cross section entails that the ventilation duct becomes excessively sensitive to partial vacuum.

On flattening-out of the prior art duct, large deformations will take place in the fold lines, for which reason the fibres there may be ruptured and be broken away from neighbouring fibres and hinder agent.

On mounting, of the prior art ventilation duct, it occasionally happens that it is subjected to rough treatment, for example is folded crosswise in an undesirable manner. If the ventilation duct has once been folded in this manner, it will be weaker in the folded region, since the fibres and the binder agent between them have been broken.

If the prior art ventilation duct is scaled up to such large dimensions as were disclosed above, which has become increasingly relevant and is employed in connection with large partial vacuums, this implies that the ventilation duct, as was intimated above, will have a tendency to collapse and be compressed. This becomes particularly serious if any of the other drawbacks disclosed above are present at the same time.

As regards ventilation ducts in general, the intention is to keep the flow losses in them as low as possible. This may be achieved by employing ventilation ducts which have large cross sectional areas. The prior art ventilation duct will accept only an extremely limited up-scaling before problems arise, since the corner regions in the duct are of insufficient mechanical strength. The problems become particularly severe if the duct is exposed to partial vacuum or partial vacuum surges. Further, large planar surfaces on the ventilation duct entail greater risk of buckling.

U.S. Pat. No. 3,818,948 also discloses a ventilation duct which includes a fibre material. This ventilation duct also displays a rectangular cross section where the corner regions between mutually meeting, longitudinal walls are joined together and sealed by means of flexible sealing strips.

According to the U.S. Patent Specification, each wait has a number of transverse rigidifying elements, for example consisting of or comprising metal wire. The duct according to the U.S. Patent Specification may also be flattened out to a substantially planar state, and probably also be rolled up for compact storage and transport.

Despite the presence of the transverse reinforcements in the walls of the duct, it lacks the ability to be self-supporting, for which reason it is only suitable for use in short lengths, for example at bends or the like. Nor is it capable of withstanding partial vacuum, since the corner regions are too weak.

It is desirable to design the duct intimated by way of introduction so that the drawbacks considered above and which largely apply to the ventilation duct according to the WO publication are wholly obviated or at least substantially reduced. Otherwise expressed, it is desirable to provide a duct with a large cross sectional area, and moreover a duct which well withstands partial vacuum, even in the form of partial vacuum surges.

It is particularly desirable to design the duct in such a manner that its corner regions and large planar surfaces will have the requisite mechanical strength and rigidity. Further, it is desirable to design the duct in such a manner that it may, in a simple manner, be secured in as retainer or a configurationally defining, element.

According, to an aspect of the present invention, in the fibre material and binder agent of the duct intimated by way of introduction, there are disposed longitudinal rigidifying elements, and that the duct, on its outside, has longitudinal bead-like projections which include the fibre material and the binder agent.

According to one preferred embodiment, the projections are disposed between mutually meeting wall sections.

BRIEF DESCRIPTION OF THE ACCOMPANYING DRAWINGS

The present invention will now be described in greater detail hereinbelow, with reference to the accompanying Drawings. In the accompanying Drawings.

DETAILED DESCRIPTION

The duct according to the present invention is primarily intended to be employed as a ventilation duct, in both excess pressure and in partial vacuum, but may naturally also be employed for other purposes. In addition, it may be given large cross sectional areas and different cross sectional configurations without causing difficulties.

Figure 1:
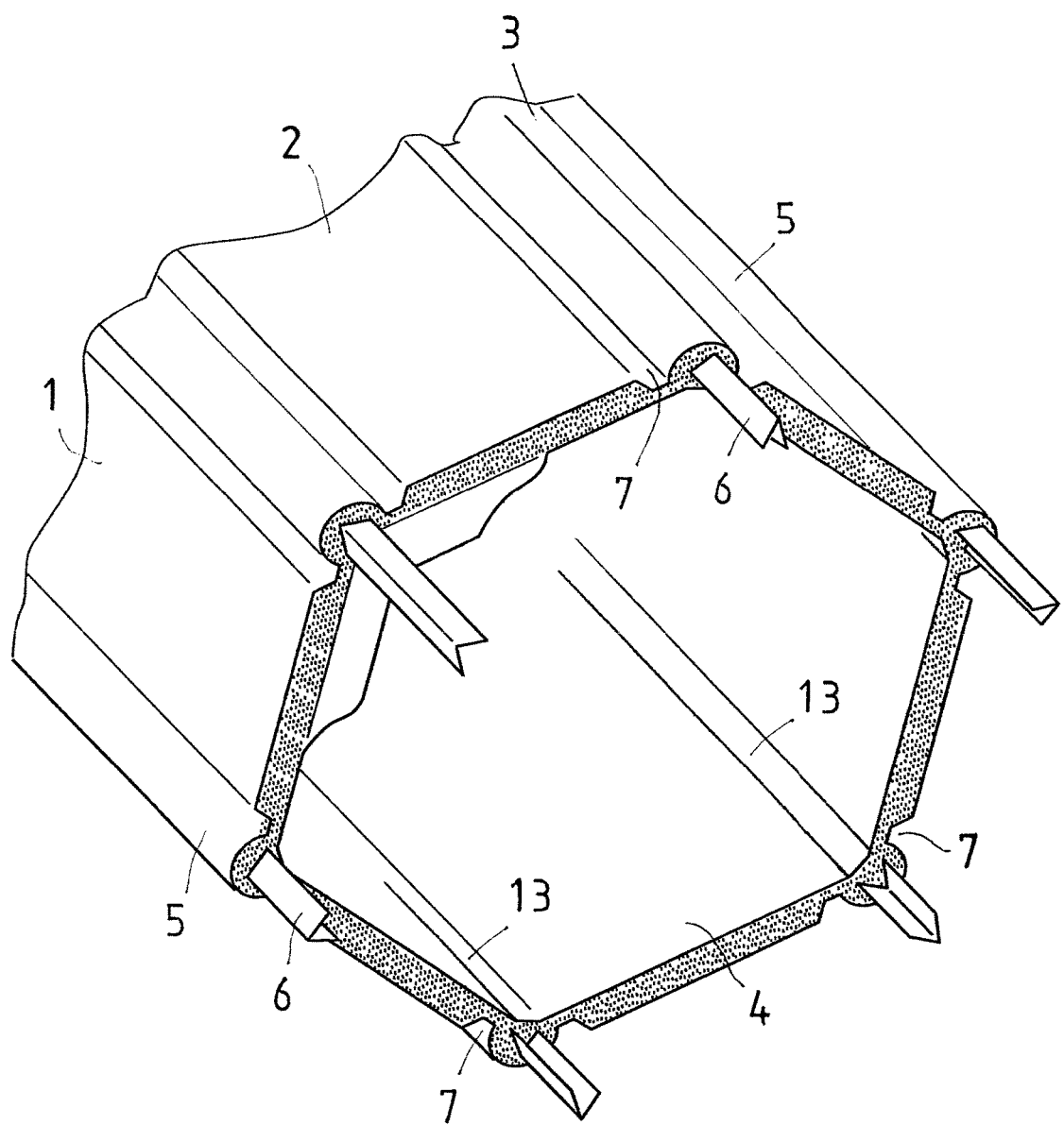
FIG. 1 is a perspective view of a short section of a hexagonal duct designed according to the present invention.

It will be apparent from FIG. 1 that the subject matter of the present invention may, in one embodiment, display regular hexagonal configuration. In this embodiment, the duct comprises six different longitudinal wall sections 1, 2, and 3, the wall sections being planar and elongate in the longitudinal direction of the duct. The wall sections preferably display planar inner and outer surfaces, without embossing or impressed patterns, apart from that which will be disclosed below.

The wall sections are produced from a refractory fibre material, such as glass fibre, mineral wool or the like, as well as a binder agent which holds together the individual fibres so that these together form a continuous path which constitutes the web or body of the wall section. On its inside, the duct has a sealing layer 4 which is impermeable to gases, in particular water vapour. The sealing layer 4 is fixed on the insides of the wall sections 1, 2 and 3 with the aid of a suitable binder agent which may possibly be the same binder agent as that which unites together the bodies of the wall sections. The sealing layer may, for example, consist of or comprise a plastic foil of suitable quality.

A sealing layer may also be disposed on the outside of the duct, even if this is not necessary in all situations. However, in such practical applications where the duct is at a lower temperature than that which applies to its ambient surroundings, it is appropriate to provide an outer sealing layer in order to prevent the penetration of moisture into the wall sections and possible condensation in them.

The duct according to the present invention may be manufactured as a closed, tube-shaped formation (FIGS. 1-5) without any longitudinal joint or seal. In such embodiments, there are disposed between neighbouring wall sections 1, 2 or 3 longitudinal fold or joint lines, which will be described in greater detail below.

According to the present invention, the duct may also be manufactured in the planar, opened out state and, as a result, in the finished state will have at least one longitudinal joint 19, 20 (FIGS. 5-8). Also in such embodiments, there are fold or joint lines between mutually interconnected wall sections 1, 2 or 3.

In those regions where adjacent wall sections 1, 2 or 3 are interconnected with one another, the duct has longitudinal, elongate, preferably bead-liked projections 5 which are interiorly provided with longitudinal rigidifying elements 6. These projections 5 fulfil the function of the above-mentioned fold or joint lines. The rigidifying elements 6 should also be manufactured from a fire-safe material, such as metal, in particular in such applications where the duct is to be given fire safety classification. Naturally, other materials may also be employed in the rigidifying elements, such as plastic with or without reinforcement, for example consisting, of or comprising carbon fibres or glass fibres. If plastic is employed in the rigidifying elements, it must be of such a quality which withstands elevated temperatures.

FIG. 1 shows the projections 5 placed in the corner regions of the cross section of the duct, i.e. where two adjacent wall sections 1, 2 or 3 meet one another. In particular in large duct dimensions, it is however also possible to provide one or more projections on the wall sections proper, for reasons which will be disclosed below.

In the embodiment with six wall sections, these may be arranged so that the duct will have a cross section which is in the form of a regular hexagon. However, the duct ma also be arranged in such a manner that it has a rectangular cross section, where both of the longitudinal sides in the rectangle are formed by two wall sections, while the short sides of the rectangle are formed by only one wall section. The fibre material from which the duct is manufactured may consist of or comprise one or more layers which together may form a uniformly thick, elongate web which is provided with binder agent and compressed together in the manufacturing process to the desired density and thickness. In practice, this implies that the wall sections may have a thickness of the order of magnitude of between 1 and 3 cm, with a considerably thicker fibre web before the compression.

As long as the sides of the duct are even in number, the duct may be flattened out to substantially planar state because of the fold or joint lines which extend in the longitudinal direction of the duct in its corner regions. This implies that the duct according to the present invention, in the flattened state, may be stored and transported in an extremely compact condition. Furthermore, the flattened state facilitates cutting of the duct in relevant lengths prior to assembly.

The projections 5 have the same fibre quantity as the wall sections 1, 2 or 3, but contain more air and less fibres and binder agent per unit of volume. Otherwise expressed, the density in the projections 5 is lower than is the case for the wall sections. Because of their lower density, the projections will be readily deformable without realising any breakdown of the fibre and binder agent connections interiorly in the projections. From this it follows that the projections 5 fulfil the function of the above-mentioned fold or joint lines.

On both sides of one projection 5 there is disposed a longitudinal depression 7 in the form of an impression in the fibre material, whereby the projection 5 will have an under-cut cross sectional configuration.

Figure 2:
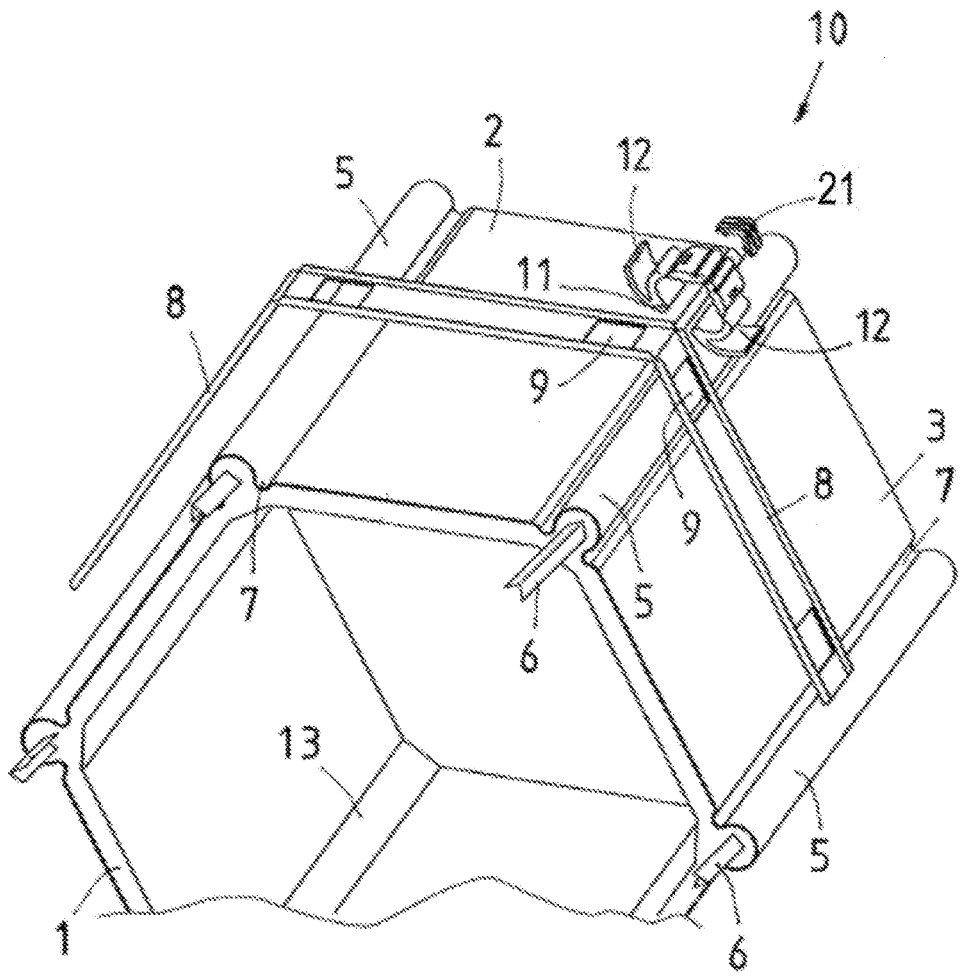
FIG. 2 shows the duct illustrated in FIG. 1 together with a configurationally stabilising suspension device and a gripping member.

FIG. 2 shows a hexagonal duct and a suspension device 8 which similarly fulfils the function of a configurationally stabilising or configurationally defining element. Such a configurationally defining element also improves the ability of the duct to withstand partial vacuum, it will apparent from the figure that the suspension device 8, in the regions of the projections 5, has two openings 9 through which a gripping member 10 may be moved in with gripping elements 11 which grip about the undercut cross section of the projection 5, preferably in the longitudinal depressions 7. In such instance, the engagement is so powerful that the gripping member 10 also grips about the longitudinal rigidifying elements 6 disposed interiorly in the projections.

It will further be apparent from FIG. 2 that the gripping members comprise pairwise gripping elements 11 pivotal towards and away from one another and which are passed in through the openings 9 into engagement with the duct. The gripping elements 11 have wings 12 which, on engagement, abut against the outsides of adjacent wall elements 1, 2 or 3, when the gripping members 10 are in position. Hereby, the wall sections are prevented from bulging outwards when the duct is subjected to an inner excess pressure. In order to maintain the pivotal gripping elements 11 in engagement with the duct, use is made of external locking members 21 which straddle each pair of gripping elements.

Figure 4:
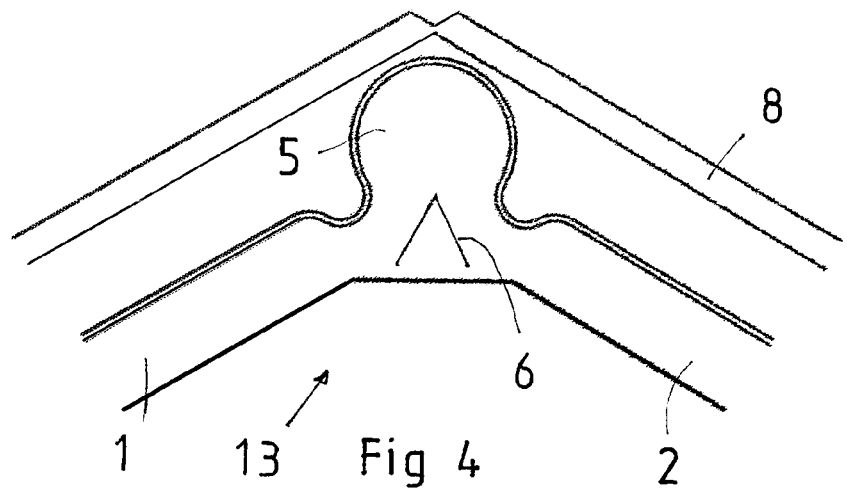
FIG. 4 is a view corresponding to that of FIG. 3, but of a different embodiment.
Figure 5:
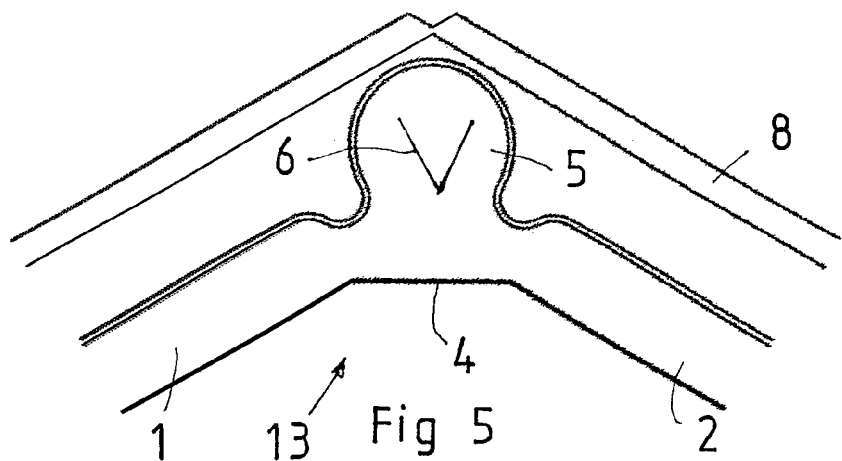
FIG. 5 is a view corresponding to that of FIGS. 3 and 4 in yet a further embodiment.
Figure 6:
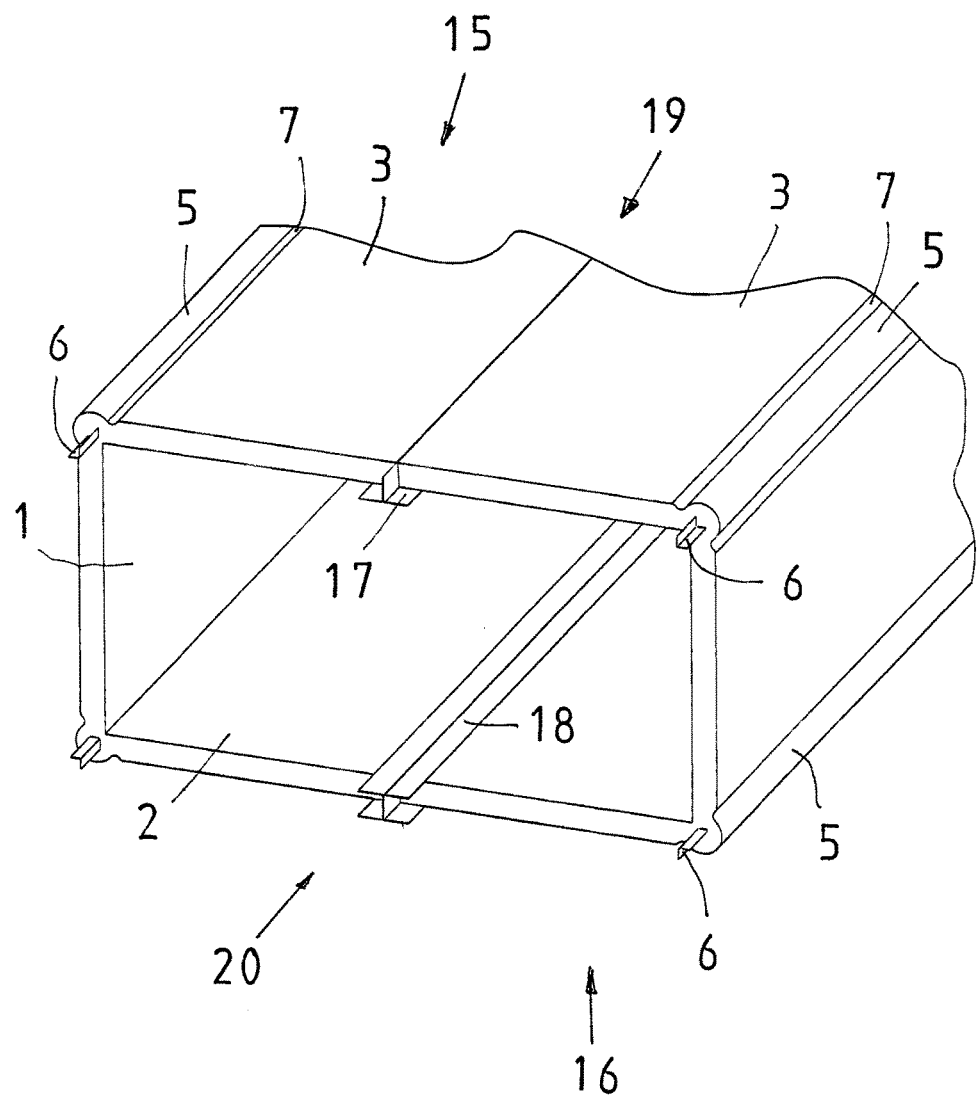
FIG. 6 is a perspective view of a short section of an alternative, rectangular duct according to the present invention.
Figure 7:
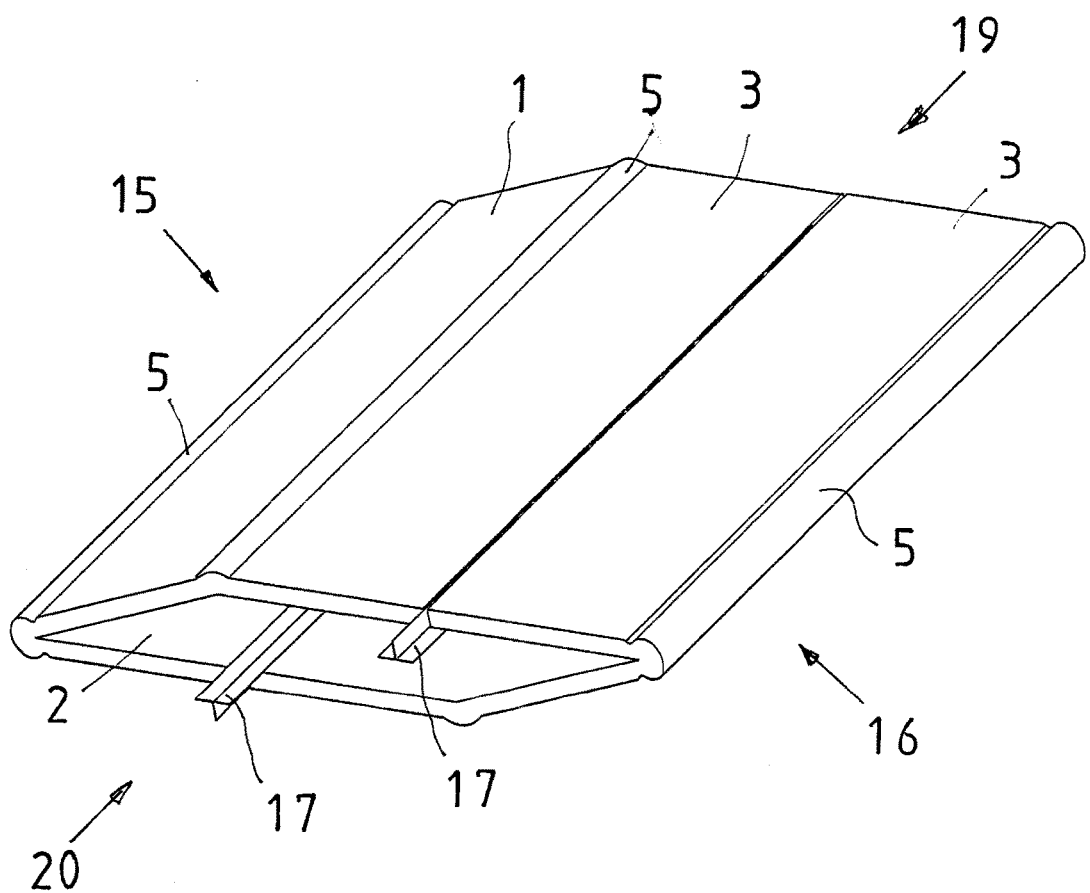
FIG. 7 is a perspective view of the duct according to FIG. 6 which is in the stage of being flattened out to the planar state.
Figure 8:
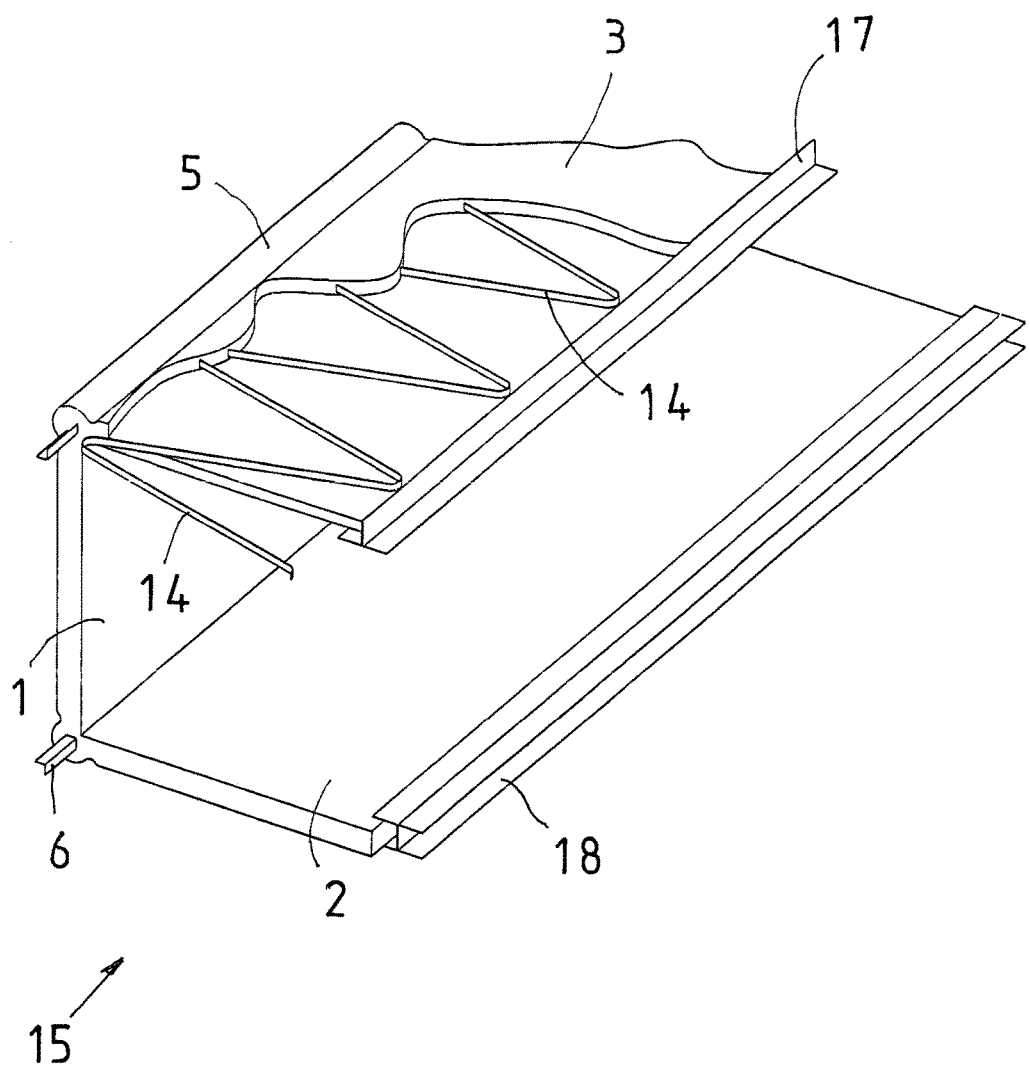
FIG. 8 is a perspective view of a part of the duct according to FIG. 6 in partly slit state.

FIGS. 1-5 relate to ducts displaying a hexagonal cross section, while FIGS. 6-8 relate to ducts having four-sided, more precisely rectangular cross section. In small duct dimensions, it is often sufficient to positionally fix certain of the projections 5 of the duct by means of suspension devices 8 and gripping members 10. On the other hand, in larger duct cross sections, it is desirable to positionally fix all projections 5. In rectangular cross sections, this applies particularly to such projections 5 as are located on the longitudinal sides of the cross section.

It follows from the above that the angle of contact of a gripping member 10 will be 90° at a right-angled corner in a rectangular duct cross section, 120° at a corner in a hexagonal cross section and 180° at a projection 5 on a planar side of a rectangular cross section. The corresponding naturally applies to the locking members 21 which thus must be available in three different designs in order to cover the above-disclosed variations.

The suspension device 8 illustrated in FIG. 2 is designed to fix four of the corner regions of the duct illustrated in this figure. However, the suspension device 8 may also, as was intimated above, extend throughout the entire cross section of the duct, and grip about all bead-shaped projections 5 and the rigidifying elements 6 disposed interiorly in them. Such an embodiment is particularly advantageous in the duct displaying larger dimensions.

Figure 3:
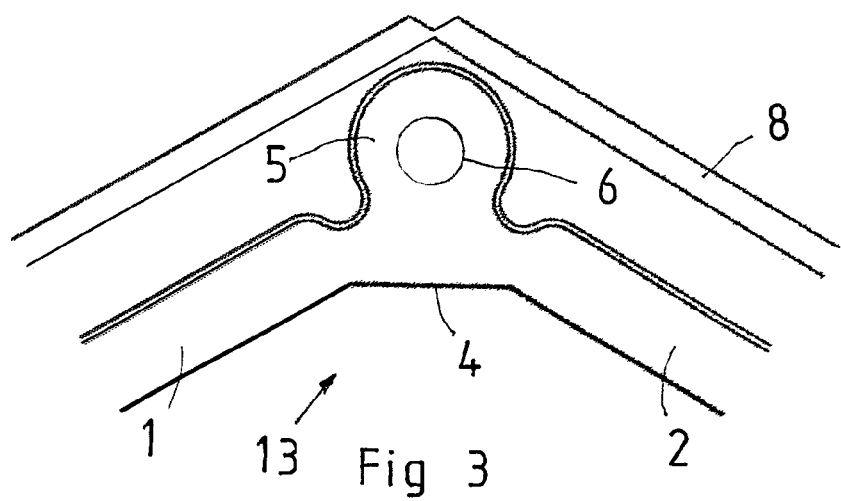
FIG. 3 shows, on a larger scale, an end elevation of a first embodiment of the corner regions of the duct.

FIG. 3 shows one embodiment where there is disposed, approximately centrally internally in the projection 5 illustrated there, a rigidifying element 6 in the form of a tube profile. On the application of the rigidifying element, regardless of the cross sectional configuration it has, it is important to obtain a good bond between the rigidifying element and the surrounding fibre material.

FIG. 4 shows an alternative rigidifying element 6 in the form of a V-shaped profile of sheet metal. In this embodiment, the rigidifying element has its apex turned to face outwards and is located proximal the inner sealing layer 4 of the duct.

In the embodiment according to FIG. 5, the rigidifying element is also a V-profile, but turned to face in the opposite direction with the apex inwards towards the centre of the duct. Analogous with that which applies according to FIG. 3, this rigidifying element is positioned approximately centrally internally in the projection 5.

In general, the rigidifying elements 6 may be placed at different positions from the inside of the inner sealing layer 4 of the duct out to the surfaces of the projections 5 turned to face away from the centre of the duct.

It will be apparent from all figures that the inside of the duct at the projections 5 has strip-shaped, substantially planar areas 13. This implies that narrow angles and any possible intimation of interior grooves or fold formation at the corners of the duct will be eliminated in that the planar areas 13 make substantially equally large angles with the insides of the surface portions 1, 2 or 3. As alternatives to the substantially planar areas 13, an arcuate, arched surface is also conceivable which gently merges from the inside of one wall section to the inside of an adjacent wall section.

FIG. 6 shows an alternative duct according to the present invention, the duct having a rectangular cross section. Analogous with the above-described embodiments, the duct has longitudinal fold lines in the form of longitudinal, bead-shaped projections 5 between adjacent wall sections 1, 2 and 3. Also analogous with the foregoing embodiments, there are disposed, interiorly in the fibre material of the longitudinal projections 5, longitudinal rigidifying elements 6.

That which distinguishes this embodiment from the above-described embodiments is the fact that the duct according to FIG. 6 is in two parts and comprises a first part 15 and a second part 16, there being joint regions 19 and 20 between the two parts 15 and 16. Thus, it is manufactured in planar spread-out state as two separate parts.

In the joint regions 19 and 20, there are provided longitudinal rigidifying elements 17 and 18, respectively, in the form of profiles preferably of metal. The uppermost rigidifying element 17 shown in FIG. 6 is of a T-shaped cross section, where the foot of the T is turned to face outwards and is located between the end surfaces of the two mutually meeting wall sections 3. Internally in the duct, there is disposed the cross of the T. The reverse orientation of the rigidifying elements 17 and 18 is also possible.

A longitudinal rigidifying element of this design gives a good degree of rigidification at the same time as the transport of heat into or out of the duct is reduced in that there is no heat absorbing/heat emitting surface on the outside of the duct with good thermal conductivity.

The longitudinal rigidifying element 18 shown at the bottom in FIG. 6 is of an H-shaped cross section, where the mutually meeting edge sections of the wall elements 2 are accommodated between the shanks of the H.

In the majority of practical applications, both of the longitudinal rigidifying elements 17 and 18 may be selected optionally as alternatives to one another.

Embodiments are also conceivable where the duct has but a single longitudinal joint 19 or 20 and consequently only one longitudinal rigidifying element 17 or 18 in the joint region. In such an embodiment, the wall section opposing the joint suitably has a bead-shaped projection 5 with a rigidifying, element 6.

For uniting the two parts 15 and 16, which together form the duct illustrated in FIG. 6, use is made of tape strips which straddle the joint between the two parts 15 and 16 and which are preferably disposed both internally and externally on the duct. The corresponding situation applies if the duct has but a single joint.

FIG. 7 shows the above-described duct when this is in the process of being flattened out to the planar state. Even if the figure does not show any longitudinal rigidifying elements 6 in the longitudinal, bead-shaped projections 5 of the duct, these are included in the embodiment, in particular if the duct is of large dimensions. In embodiments with small cross sectional surfaces, the longitudinal rigidifying elements 6 may however be dispensed with.

It will be apparent from the Drawing that two of the fold lines, i.e. the projections 5, are flattened out while two are folded more tightly.

In the embodiment illustrated in FIG. 7, both of the longitudinal rigidifying elements 17 disposed between both parts 15 and 16 of the duct are of the same design, namely with a T-shaped cross section.

In such cases where extremely high pressure differences across the walls of the duct are to be withstood, it may, as shown in FIG. 8, be appropriate also to provide the duct with transversely directed rigidifying elements 14, i.e. rigidifying elements which extend more or less at right angles or transversely of the longitudinal direction of the wall sections 1, 2 or 3 of the duct.

In the illustrated embodiment, the transverse rigidifying elements 14 comprise strips of metal, which are disposed in zigzag configuration interiorly in the fibre and binder agent material of the wall sections 1, 2 or 1. The rigidifying elements have narrow, elongate or strip-shaped cross section where the longitudinal direction of the cross section is transversely directed, possibly at right angles, to the planar outside or inside of the wall section.

FIG. 8 shows but one embodiment where the transverse rigidifying elements are disposed in those walls which form the longitudinal sides of the rectangular cross section. In certain cases this may be sufficient, but in other cases it may also be appropriate to provide the short sides of the rectangular cross section with transverse rigidifying elements.

Analogous with the above-described longitudinal rigidifying elements 6, the transverse rigidifying elements 14 are secured in the fibre material of the wall elements and suitably have firm anchoring both with the fibres and with the binder agent bonding them together.

What is claimed is:

1. A duct comprising a number of wall sections at least partly produced from a refractory fibre material and a binder agent that holds together individual fibers of the fibre material, the fibre material and the binder agent being compressed so that the individual fibres are connected, which together define a closed, elongate flow space, mutually meeting wall sections being united by the intermediary of at least one longitudinal fold or joint line permitting the duct to be foldable to a first condition in which the flow space has a first cross-sectional area and unfoldable to a second, expanded condition in which the flow space has a second cross-sectional area that is greater than the first cross-sectional area, the duct comprising six wall sections arranged in a form of one of a regular hexagon cross-section and a rectangle in cross-section, the rectangle having two long sides each formed by at least two wall sections and two short sides formed by at least one wall section, wherein there are disposed, in the fibre material and binder agent of the duct, longitudinal rigidifying elements and that the duct has, on its outside, longitudinal bead-like projections which comprise the fibre material and the binder agent.

2. The duct as claimed in claim 1, wherein the projections are located between mutually meeting wall sections.

3. The duct as claimed in claim 1, wherein at least certain of the rigidifying elements are disposed internally in the projections.

4. The duct as claimed in claim 1, wherein, in the fibre material and binder agent of the wall sections, there are disposed transverse rigidifying elements.

5. The duct as claimed in claim 1, the duct having at least one longitudinal joint, wherein a longitudinal rigidifying element is disposed in the joint region or the joint regions.

6. The duct as claimed in claim 5, wherein the rigidifying elements disposed in the joint regions display T- or H-profile.

7. The duct as claimed in claim 4, wherein the transverse rigidifying elements are zigzag-shaped and extend throughout substantially the entire width of the wall sections.

8. The duct as claimed in claim 4, wherein the transverse rigidifying elements display elongate, strip-shaped cross section, where the longitudinal direction of the cross section is transversely directed to the substantially planar inside or outside of the relevant wall section.

9. The duct as claimed in claim 1, wherein the projections comprise the same fibre material and binder agent as the wall sections, but however of lower density.

10. The duct as claimed in claim 1, wherein the projections have undercut cross section in order thereby to serve as fixing means for a gripping member on one or more suspension devices.

11. The duct as claimed in claim 10, wherein on both sides of the connection of the projection to adjacent wall sections, there are longitudinal depressions of lesser material thickness than the material thickness in adjacent wall sections.

12. The duct as claimed in claim 1, wherein, on its inside in register with the projections, the duct has longitudinal, substantially planar or possibly somewhat arcuate regions, which even out the transition between adjacent interior surfaces on the adjacent surface sections.

13. The duct as claimed in claim 12, wherein the substantially planar regions along their edges make substantially equally large angles with the interior surfaces of adjacent wall sections.

14. The duct as claimed in claim 1, wherein the rigidifying elements comprise profiles of metal or other material resistant to elevated temperatures.

\* \* \* \* \*